US010921896B2

(12) United States Patent
Lopez et al.

(10) Patent No.: US 10,921,896 B2
(45) Date of Patent: Feb. 16, 2021

(54) DEVICE INTERACTION IN AUGMENTED REALITY

(71) Applicant: Facebook Technologies, LLC, Menlo Park, CA (US)

(72) Inventors: Javier San Agustin Lopez, Copenhagen (DK); Martin Henrik Tall, Frederiksberg (DK); Rasmus Dahl, Copenhagen (DK); Jonas Priesum, Copenhagen (DK)

(73) Assignee: Facebook Technologies, LLC, Menlo Park, CA (US)

( * ) Notice: Subject to any disclaimer, the term of this patent is extended or adjusted under 35 U.S.C. 154(b) by 438 days.

(21) Appl. No.: 15/071,750

(22) Filed: Mar. 16, 2016

(65) Prior Publication Data
US 2016/0274762 A1 Sep. 22, 2016

Related U.S. Application Data

(60) Provisional application No. 62/133,831, filed on Mar. 16, 2015.

(51) Int. Cl.
*G06F 3/01* (2006.01)
*G06T 19/00* (2011.01)
(Continued)

(52) U.S. Cl.
CPC .............. *G06F 3/017* (2013.01); *G06F 1/163* (2013.01); *G06F 3/012* (2013.01); *G06F 3/013* (2013.01);
(Continued)

(58) Field of Classification Search
CPC .......... G06F 3/013; G06F 3/017; G06F 3/167; G06T 19/006; H04N 21/42208
(Continued)

(56) References Cited

U.S. PATENT DOCUMENTS 8,976,110 B2 3/2015 Eskilsson et al.
9,185,352 B1 11/2015 Jacques
(Continued)

FOREIGN PATENT DOCUMENTS

CN 103201731 A 7/2013
CN 104423046 A 3/2015
(Continued)

OTHER PUBLICATIONS

Heo, H. et al., "Nonwearabie Gaze Tracking System for Controlling Home Appliance," The Scientific World Journal, 2014, vol. 2014, No. 303670, 20 pages.
(Continued)

*Primary Examiner* — Cao H Nguyen
(74) *Attorney, Agent, or Firm* — Fenwick & West LLP

(57) ABSTRACT

An augmented reality (AR) device can access a library of applications or user interfaces (UIs) designed to control a set of devices. The AR device can determine which UI to present based on detection of a device to be controlled near the AR device. For example, a user wearing an AR device may look at a thermostat placed on a wall and a UI to control the thermostat may be presented to the user. The determination that the user is looking at the thermostat may be made by correlating the gaze tracking information of the user-facing camera with the location of the thermostat in an image captured by a world-facing camera. Determination of the location of the thermostat in the image can be performed using image recognition technology. The UI can be selected based on a database record pairing the UI with the thermostat.

20 Claims, 14 Drawing Sheets

(51) Int. Cl.
*G06F 3/0488* (2013.01)
*G06F 1/16* (2006.01)
*G06F 3/16* (2006.01)
*G06K 9/00* (2006.01)

(52) U.S. Cl.
CPC ....... *G06F 3/0488* (2013.01); *G06K 9/00604* (2013.01); *G06K 9/00671* (2013.01); *G06T 19/006* (2013.01); *G06F 3/167* (2013.01)

(58) Field of Classification Search
USPC .......................................... 715/700, 702, 746
See application file for complete search history.

(56) References Cited

U.S. PATENT DOCUMENTS

| | | | |
|---|---|---|---|
| 9,600,069 B2* | 3/2017 | Publicover | G06F 3/013 |
| 2011/0231757 A1* | 9/2011 | Haddick | G02B 27/017 |
| | | | 715/702 |
| 2012/0127201 A1 | 5/2012 | Kim et al. | |
| 2013/0335193 A1 | 12/2013 | Hanson et al. | |
| 2013/0346168 A1 | 12/2013 | Zhou et al. | |
| 2014/0121834 A1 | 5/2014 | Ogawa et al. | |
| 2014/0198130 A1 | 7/2014 | Lacroix | |
| 2014/0225918 A1* | 8/2014 | Mittal | G06F 3/017 |
| | | | 345/633 |
| 2014/0266983 A1 | 9/2014 | Christensen | |
| 2014/0285520 A1 | 9/2014 | Park et al. | |
| 2015/0019694 A1 | 1/2015 | Feng et al. | |
| 2015/0028746 A1* | 1/2015 | Temple | H05B 47/19 |
| | | | 315/129 |
| 2015/0077329 A1 | 3/2015 | Yoon et al. | |
| 2015/0202962 A1 | 7/2015 | Habashima et al. | |
| 2015/0220157 A1* | 8/2015 | Marggraff | G06F 3/017 |
| | | | 345/156 |
| 2015/0346830 A1 | 12/2015 | Chang et al. | |
| 2015/0358614 A1* | 12/2015 | Jin | G02B 27/017 |
| | | | 348/49 |
| 2015/0378431 A1 | 12/2015 | Donaldson | |
| 2016/0004321 A1 | 1/2016 | Takada et al. | |
| 2016/0048311 A1 | 2/2016 | Purvis et al. | |
| 2016/0171777 A1* | 6/2016 | Todeschini | G06T 19/006 |
| | | | 345/633 |
| 2016/0299675 A1 | 10/2016 | Winde | |
| 2017/0048373 A1 | 2/2017 | Dees | |
| 2017/0108838 A1* | 4/2017 | Todeschini | G05B 15/02 |
| 2018/0129283 A1 | 5/2018 | Lee et al. | |

FOREIGN PATENT DOCUMENTS

| | | |
|---|---|---|
| CN | 104969264 A | 10/2015 |
| WO | WO-2015/138271 A1 | 9/2015 |

OTHER PUBLICATIONS

Vertegaal, R. et ai., Media EyePliances: Using Eye Tracking for Remote Control Focus Selection of Appliances11, Proceeding Extended Abstracts on Human Factors in Computing Systems, Apr. 2005, pp. 1861-1864.

* cited by examiner

Front View

Rear View

DEVICE INTERACTION IN AUGMENTED REALITY

PRIORITY CLAIM

The application claims priority to U.S. Provisional Patent Application No. 62/133,831, filed Mar. 16, 2015, entitled "Device Interaction in Augmented Reality," which is incorporated herein by reference in its entirety.

TECHNICAL FIELD

The present disclosure generally relates to the control of devices and, more specifically, in one embodiment, to systems and methods of controlling devices viewed in augmented reality.

BACKGROUND

An augmented reality system may present contextual information about a user's surroundings.

BRIEF DESCRIPTION OF THE DRAWINGS

Some embodiments are illustrated by way of example and not of limitation in the figures of the accompanying drawings.

DETAILED DESCRIPTION

Figure 1:
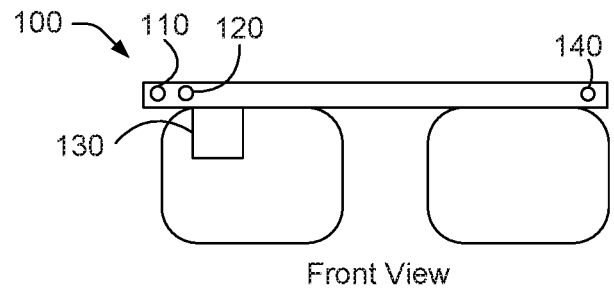
FIG. 1 is a device diagram of an example computing device capable of providing device interaction in augmented reality, according to some embodiments.
Figure 1:
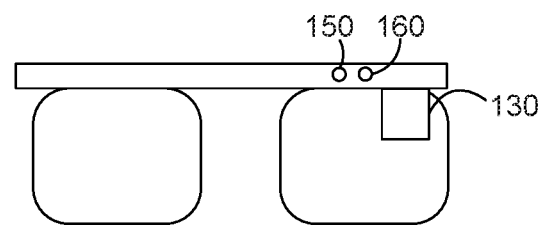

Example systems and methods to facilitate control of one or more devices via an augmented reality interface are described. In the following description, for purposes of explanation, numerous specific details are set forth in order to provide a thorough understanding of example embodiments. It will be evident, however, to one skilled in the art, that the present technology may be practiced without these specific details.

Augmented reality (AR) devices display information to a user while simultaneously allowing the user to view the world directly. Example augmented reality devices include Microsoft HoloLens, Google Glass, and heads-up displays (HUDs) in vehicles. Virtual reality devices display information to a user while substantially obscuring the user's vision of the world. Example virtual reality devices include Oculus Rift, HTC Vive, and PlayStation VR. Thus, for example, some AR devices and VR devices are wearable computing devices. Unless noted otherwise, the methods and systems described herein may be applied to both augmented reality and virtual reality devices, even if described in example embodiments using a specific type of device. The device may include a camera directed toward the wearer's eyes, usable to perform gaze tracking.

A user of a computing device (e.g., an augmented reality or virtual reality device) may interact with and control objects and applications displayed on the computing device through the user's eye movement. An image of the user's eyes or face, captured by one or more face-facing cameras on or coupled to the computing device, may be analyzed using computer-vision algorithms, such as, for example, eye tracking algorithms and gaze detection algorithms. For example, the captured images may be processed to extract information relating to features of the user's eyes or face. The computing device may then use the extracted information to determine the location of the user's eyes and estimate the direction in which the user is looking (e.g., gaze direction), the location on the display at which the user is looking, or both. The user's point of regard is the point at which the user's eyes are focused, as interpreted by the computing device. For example, a line beginning at the user's eye and heading in the direction of the user's gaze may be intersected with a plane of a display or with an object to determine a point of regard on the display or the object. As another example, lines beginning at each of a user's eyes may be traced until they intersect to determine a point of regard in space. These methods to calculate the point of regard of the user also apply to virtual environments generated by a VR headset.

Using the gaze direction or point of regard, the computing device may be able to estimate at which icon on the display the user is looking. The estimation of where the user is looking may be used to direct one or more objects, applications, and the like to perform a particular operation. For example, the user may direct and control the movement of an object on the display depending on where the user is looking on the display of the computing device, including the movement of objects in a virtual environment. As another example, displayed information may be scrolled based on the location the user is viewing.

An AR device can access a library of applications or user interfaces (UIs) designed to control a set of devices. The AR device can determine which UI to present based on detection of a device to be controlled near the AR device. For example, a user wearing an AR device may look at a thermostat placed on a wall and a UI to control the thermostat may be presented to the user. The determination that the user is looking at the thermostat may be made by correlating the gaze tracking information of the user-facing camera with the location of the thermostat in an image captured by a world-facing camera (e.g., a camera facing away from the user). Determination of the location of the thermostat in the image can be performed using image recognition technology. The UI can be selected based on a database record pairing the UI with the thermostat. In some example embodiments, the database is stored on the AR device. In other example embodiments, the database is stored on a server accessible over a network (e.g., the Internet) from the AR device.

Continuing with the example of the thermostat, the UI may present information regarding the current status of the target device (e.g., current temperature, mode, target temperature) as well as controls to interact with the interface (e.g., to turn off the thermostat or adjust the target temperature). The UI may be controlled through a variety of input modalities including voice recognition, hand or head gestures, eye gaze, electromyography (EMG), electroencephalography (EEG), a gamepad, a motion controller, or any suitable combination thereof. The UI may also be controlled through user interaction with a second device associated with the AR device. For example, a selected UI may be presented in the second device. The user may then interact with the UI using the second device. For example, the user may touch, tap, or swipe a touchscreen on a smart watch or smart phone, press a button or point with a controller, or tap an armband equipped with motion sensors.

FIG. 1 is a device diagram of an example AR device 100 capable of facilitating eye tracking control. The AR device 100 may be any type of AR device, including, but not limited to, a head-mounted device, an in-vehicle dashboard or heads-up display, and the like.

The AR device 100 may include a camera module 110. The camera module 110 includes one or more outward- or world-facing cameras placed in a suitable location in the AR device 100 to capture images of the world as seen by the user. In some example embodiments, the camera module 110 is used to identify the objects present in the field of view of the user. The camera module 110 may include a black and white (e.g., monochrome) or color (e.g., red-green-blue (RGB)) complementary metal-oxide-semiconductor (CMOS) sensor running at an appropriate frame per second rate, a lens with an appropriate field of view and depth of field, or any suitable combination thereof. In some embodiments, the camera module 110 includes a depth sensor. In some embodiments, the camera module 110 includes a time-of-flight camera.

The AR device 100 may include one or more light sources 120 such as light-emitting diodes (LEDs). In some embodiments, the one or more light sources 120 are infrared LEDs. In some embodiments, the one or more light sources 120 are infrared lasers. In some embodiments, the one or more infrared lasers emit structured light that allows the one or more camera modules 110 to reconstruct a 3D scene. For explanatory purposes, LEDs (e.g., infrared LEDs) may be used to describe the one or more light sources 120 throughout the disclosure. However, one of ordinary skill in the art will appreciate that any appropriate light-emitting source may be used.

In some embodiments, the AR device 100 includes an infrared (IR) detector 140 capable of detecting IR markers emitted by objects present in the scene. Each emitter may provide a different code or pattern, allowing the IR detector to identify the corresponding object (e.g., a device for which a user interface should be presented when the object is detected). In some example embodiments, the emitter merely indicates that an object is present, triggering the AR device 100 to attempt to identify the object through other means (e.g., activating a camera to identify the object through image recognition or activating a Bluetooth radio).

In some example embodiments, the camera module 110 also includes a suitable type of infrared pass filter (e.g., active, mechanical, high-pass, band-pass, or any suitable combination thereof). In some example embodiments, the cameras in the camera module 110 include an infrared-pass filter for one set of cameras and an infrared-blocking filter for another set of cameras.

The AR device 100 includes a display 130. The display may be a liquid crystal on silicon display using field-sequential color and LED illumination. Other display technologies may also be used.

The AR device 100 may include a camera module 150. The camera module 150 may include one or more user-facing cameras placed in any suitable location in any manner within the AR device 100 (e.g., tilted at an angle such that it points toward the user's eyes) and may be used to capture images of the user's eyes. In some embodiments, the camera module 150 includes two cameras, one pointing at each eye. The camera module 150 may include a black and white (e.g., monochrome) or color (e.g., red-green-blue (RGB)) complementary metal-oxide-semiconductor (CMOS) sensor running at an appropriate frame per second rate, a lens with an appropriate field of view and depth of field (e.g., approximately 1 to 5 cm), or any suitable combination thereof.

The AR device 100 may use eye tracking control software to analyze the images taken by the camera module 150 and provide coordinates (e.g., two-dimensional/x, y coordinates or three-dimensional/x, y, z coordinates) of where the user is looking on the display 130 of the AR device 100, or in the world around the user, be it real or virtual in the case of a VR headset. The coordinates may be used for any number of applications (e.g., selecting objects, playing games, applying foveated rendering techniques, or any suitable combination thereof).

The camera modules 110 and 150 may be turned on and off in any manner, such as by an eye tracking engine when an application starts or stops the eye tracking engine; an external slider; dedicated on-off button on the AR device 100; an application or a digital button on the display 130; movement or shaking of the AR device 100; voice commands; on-screen capacitive buttons; touch pads; bio-signals (e.g., EMG or EEG); remote wireless control; or any suitable combination thereof. In some embodiments, the camera modules 110 and 150 are controlled by an application using the eye tracking features. As such, in some embodiments, the eye tracking components consume power only while the camera is turned on (e.g., when the user is using the eye tracking features).

The AR device 100 may include one or more light sources 160. In some embodiments, the one or more light sources 160 are infrared LEDs. For explanatory purposes, infrared LEDs may be used to describe the one or more light sources 160 throughout the disclosure. However, one of ordinary skill in the art will appreciate that any appropriate light-emitting source may be used.

The one or more cameras in the camera module 150 may be placed at an appropriate distance from the one or more light sources 160 to optimize the proper capture of the infrared light. In some embodiments, a light source 160 is placed next to or on top of the one or more cameras.

In some example embodiments, the camera module 150 also includes a suitable type of infrared pass filter (e.g., active, mechanical, high-pass, band-pass, or any suitable combination thereof). In some example embodiments, the cameras in the camera module 150 include an infrared-pass filter for one set of cameras and an infrared-blocking filter for another set of cameras.

An image of the user, including the user's eye, may be captured by the one or more cameras of the camera module 150. The light sources 160 may emit light that is directed toward the eyes of the user. The infrared light from the light sources 160 may be reflected in the pupil and on the cornea of the user and recorded by the cameras in the camera module 150. In some embodiments, the light sources 160 are synchronized with the one or more cameras so that the light sources 160 emit light only when the one or more cameras are taking an image and remain off otherwise.

In some example embodiments, the light sources 120 and 160 and camera modules 110 and 150 are turned off or set in low-power mode when the AR device is not worn by the user. For example, this situation may be detected by a proximity sensor present in the AR device 100.

In some example embodiments, the camera module 110, the camera module 150, the light sources 120, or the light sources 160 are included in an external device that is connected to the AR device 100 (e.g., an external docking device) instead of being located within the AR device 100. The external device may include any suitable hardware-implemented modules to perform eye tracking functions, such as hardware-implemented modules to process the images taken by the camera modules 110 or 150 (e.g. a dedicated image signal processor (ISP)), control the light sources 120 or 160, or any suitable combination thereof.

Figure 2:
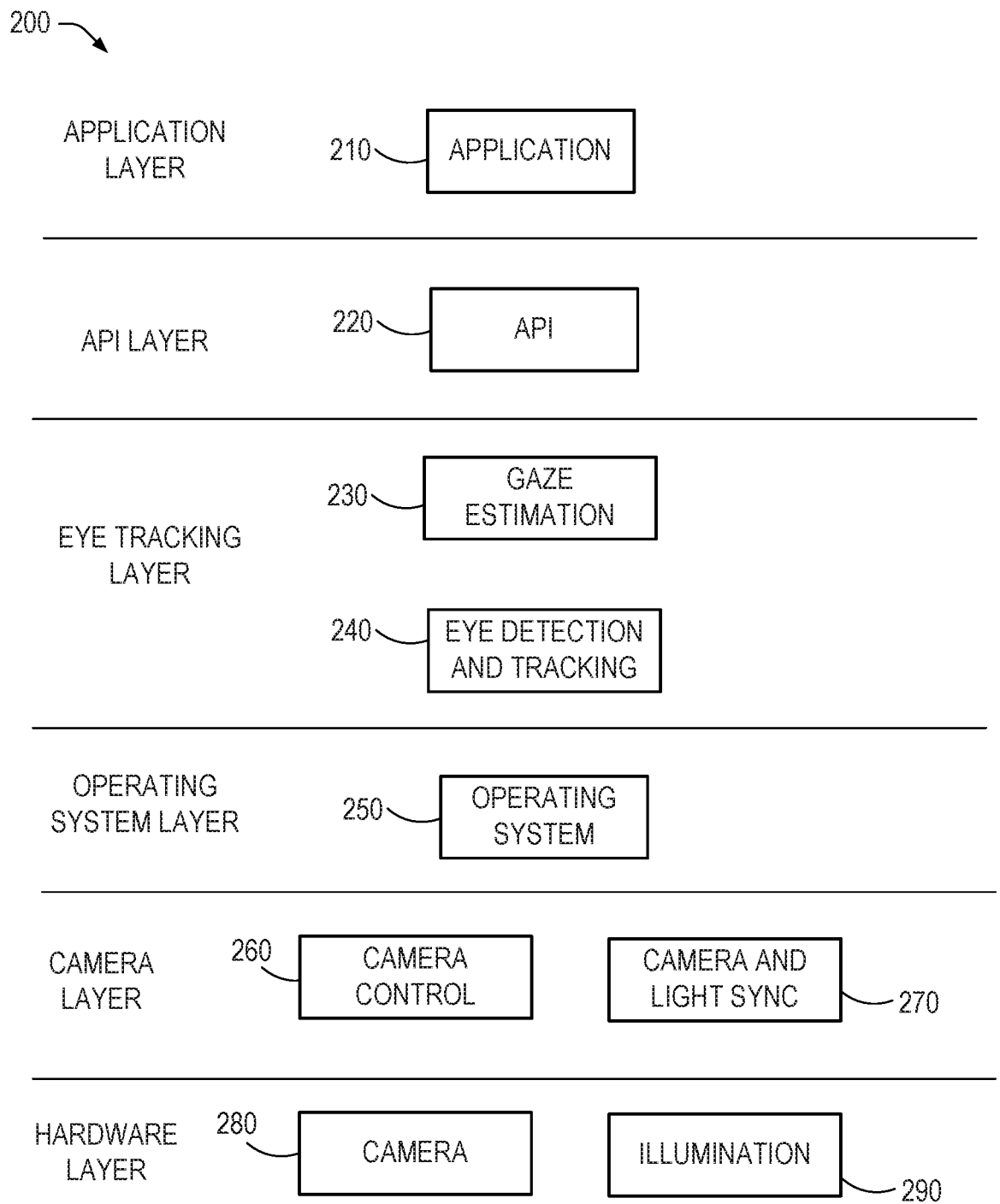
FIG. 2 is a block diagram of an example software architecture for facilitating eye tracking control, according to some embodiments.

FIG. 2 is a block diagram of an example software architecture 200 for facilitating eye tracking control. Any one or more of the components of the software architecture 200 may run on either a central processing unit (CPU) of the AR device 100 or on a combination of a CPU and a graphics processing unit (GPU) of the AR device 100. In some example embodiments, one or more of the components of the software architecture 200 run on a dedicated chip. The software may run as a background process (e.g., as part of an operating system (OS) or in a web browser) and may provide an application programming interface (API) that other applications can access. The API may fire an event or use some other similar mechanism to send information about where the user is looking on the screen to other applications. One of ordinary skill in the art will appreciate that additional or fewer elements may be included in the example software architecture 200 shown in FIG. 2.

The software architecture 200 may be divided into different layers. The bottom layer may include a camera module 280 and an illumination module 290 that correspond to the respective hardware. A camera layer may include a camera control module 260 that is in charge of communicating with each camera in order to perform camera operations such as starting the camera, grabbing images, controlling the camera properties, triggering the sensor to grab an image, or any suitable combination thereof. The camera control module 260 may also include the circuitry necessary to process the images delivered by the camera module 280. For instance, the camera control module 260 may include a processor (e.g., an ISP) that may optimize image quality, detect regions of interest on the image delivered by the camera module 280, crop the image delivered by the camera module 280, etc. The camera layer may also include a camera and light sync module 270, which synchronizes the cameras and the emitters (e.g., infrared emitters) so that the lights are controlled in such way that tracking of the user's eyes is improved, gaze accuracy is increased, energy consumption is minimized, or any combination thereof. In some example embodiments, eye tracking algorithms are used to optimize the illumination by decreasing or increasing the amount of light depending on parameters issued by the eye tracking engine or the camera control module 260. In some example embodiments, the camera layer is configured to strobe the light sources 160 at the frequency of the camera trigger output. In some example embodiments, this synchronization is achieved by using one or more trigger signals provided by the camera layer to the camera module 280 and the illumination module 290.

Once an image is captured by the sensor of the camera module 280, the image is sent to an eye tracking layer for further processing (e.g. detection of eye features and calculation of gaze direction or point of regard). In some embodiments, the camera layer delivers images to the camera control module 260, which processes the images before delivering them to the eye tracking layer. In the eye tracking layer, an eye detection and tracking module 240 may process images to find features such as eye region location, pupil center, pupil size, location of the corneal reflections, eye corners, iris center, iris size, or any suitable combination thereof. These features may be used by a gaze estimation module 230, which may be in charge of calculating the point of regard of the user. The gaze estimation module 230 may also calculate the optical and visual axes of the user's eyes and calibrate the calculation based on specific features of the user.

In some example embodiments, the operating system layer (including the operating system 250) provides a bridge between the camera layer and the eye tracking layer. The operating system 250 may provide standardized interfaces for applications to interact with hardware via device drivers.

An API layer may be used for communication between the eye tracking layer and an application layer including applications that use eye gaze information. An API module 220 may send data calculated by the eye tracking layer, such as coordinates of the point of regard, three-dimensional (3D) vector of the user's gaze direction, pupil size, blink rates, or any suitable combination thereof. The API module 220 may also accept commands from an application to the eye tracking layer (e.g., to start and/or stop the eye tracking engine, query for specific information, change the mode in which the eye tracking engine works, etc.). An application module 210 in the application layer may connect to the API module 220 and use eye gaze information for any suitable purpose (e.g., to control an app or a game, record eye data for future use, determine the drowsiness level of a driver, measure a person's interest in a particular object, or any suitable combination thereof).

Figure 3:
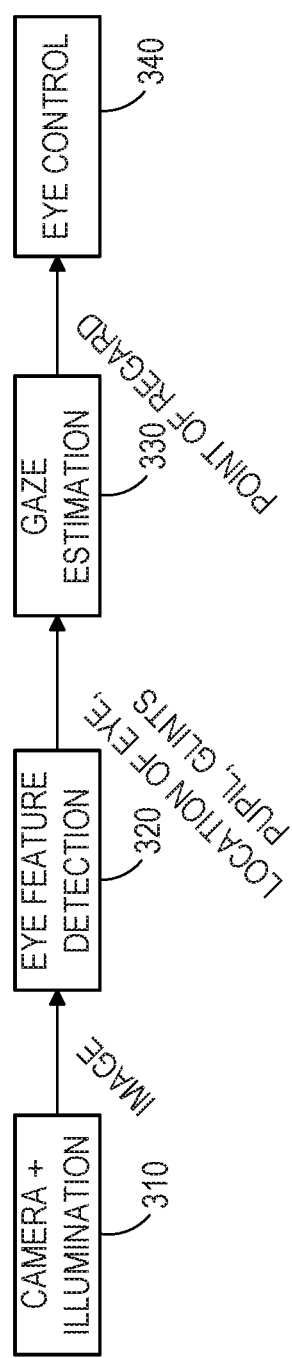
FIG. 3 is a block diagram of an example flow of data used to facilitate eye tracking control, according to some embodiments.

FIG. 3 is a block diagram of an example flow of data used to facilitate eye tracking control. One or more cameras and the illumination modules 310 (e.g., providing illumination via infrared LEDs) may capture an image of the user's eye or eyes. An eye feature detection module 320 may use the captured data to detect eye features (e.g., location of eye(s), pupils, corneal reflections, etc.). Using the detected eye features, a gaze estimation module 330 may estimate the user's point of regard, which may then be used to control aspects of an application through an eye control module 340.

Figure 4:
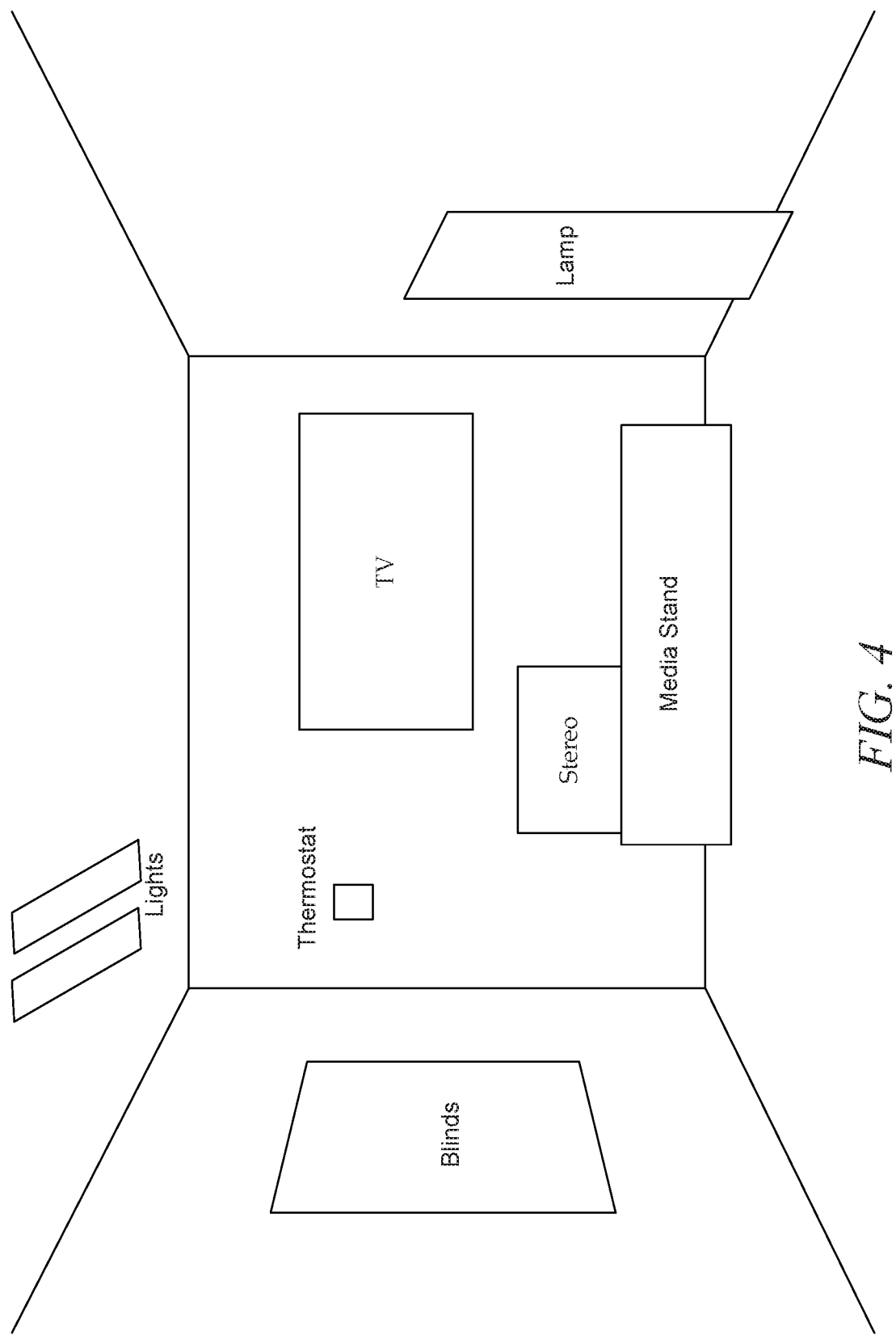
FIG. 4 is a block diagram of an example environment in which device interaction in augmented reality may be provided.

FIG. 4 shows an example environment in which an AR device may be used, in the form of a living room. Target devices within the environment shown in FIG. 4 include window blinds, lights, a thermostat, a TV, a stereo, a media stand, and a lamp. These target devices may be connected to a local network, to the Internet, directly to the AR device, or any suitable combination thereof. The target devices may be controlled by a smartphone, a tablet, an AR device, or another computing device. Other example target devices (i.e., devices subject to control by the systems and methods described herein) include, but are not limited to, smoke detectors, locks in doors, cars, bikes, music players, gaming consoles, and kitchen appliances.

In some example embodiments, each target device is controlled by a separate application (app). The app may present a UI to the user that allows the user to gather information regarding the current state of the target device (e.g., light intensity or color of a selected light bulb), modify the settings of the target device (e.g., increase the light intensity, change the color, set a time for automatic switch-off), or both.

The AR device is made aware of the target devices present in the environment, in the user's field of view, or both. The AR device may use forward-pointing cameras to locate the one or more physical devices present in the environment. This can be done by using image recognition techniques, by employing infrared markers, or both. Furthermore, the system may have a 3D model of the environment, and may know the position and orientation of the user in the 3D space by applying different techniques (e.g., triangulation of wireless or light signals, RFID tags, ultra-wideband pulses, or any suitable combination thereof). Communication between the AR device and the device may happen directly (e.g., via Bluetooth or direct Wi-Fi), over a network (e.g., a local wireless network or the Internet), or by using another device (e.g., a smartphone or tablet) as a proxy which then connects to the controlled device directly or over a network.

The UI may be presented to the user as an overlay next to or on top of the physical device when the user's gaze is directed at the device. In some example embodiments, the UI is presented when the AR device is pointed toward the physical device, without regard to the point of regard of the user. In some example embodiments, the UI is presented in response to a voice command (e.g., "control thermostat in living room").

With respect to FIGS. 4-13, a VR device would perform in largely the same manner as an AR device, except that the user would be viewing a computer-generated image instead of a physical room. In some example embodiments, the VR device includes one or more world-facing cameras that record the scene in front of the user. The VR device may include images of the scene captured in this way within the virtual scene, overlaid on top of the virtual scene, or both. Similarly, the devices seen by the user are virtual, and may correspond to physical devices or virtual ones. For example, a user that is travelling may use VR to tour his own living room and control physical devices therein. As another example, a user playing a VR game may control aspects of the game by interacting with virtual devices within the virtual environment. As yet another example, a video stream of the real world may be captured by one or more front-facing cameras and presented within the virtual scene. Each frame of the video stream is an image on which object detection algorithms may be run to identify depicted objects.

Figure 5:
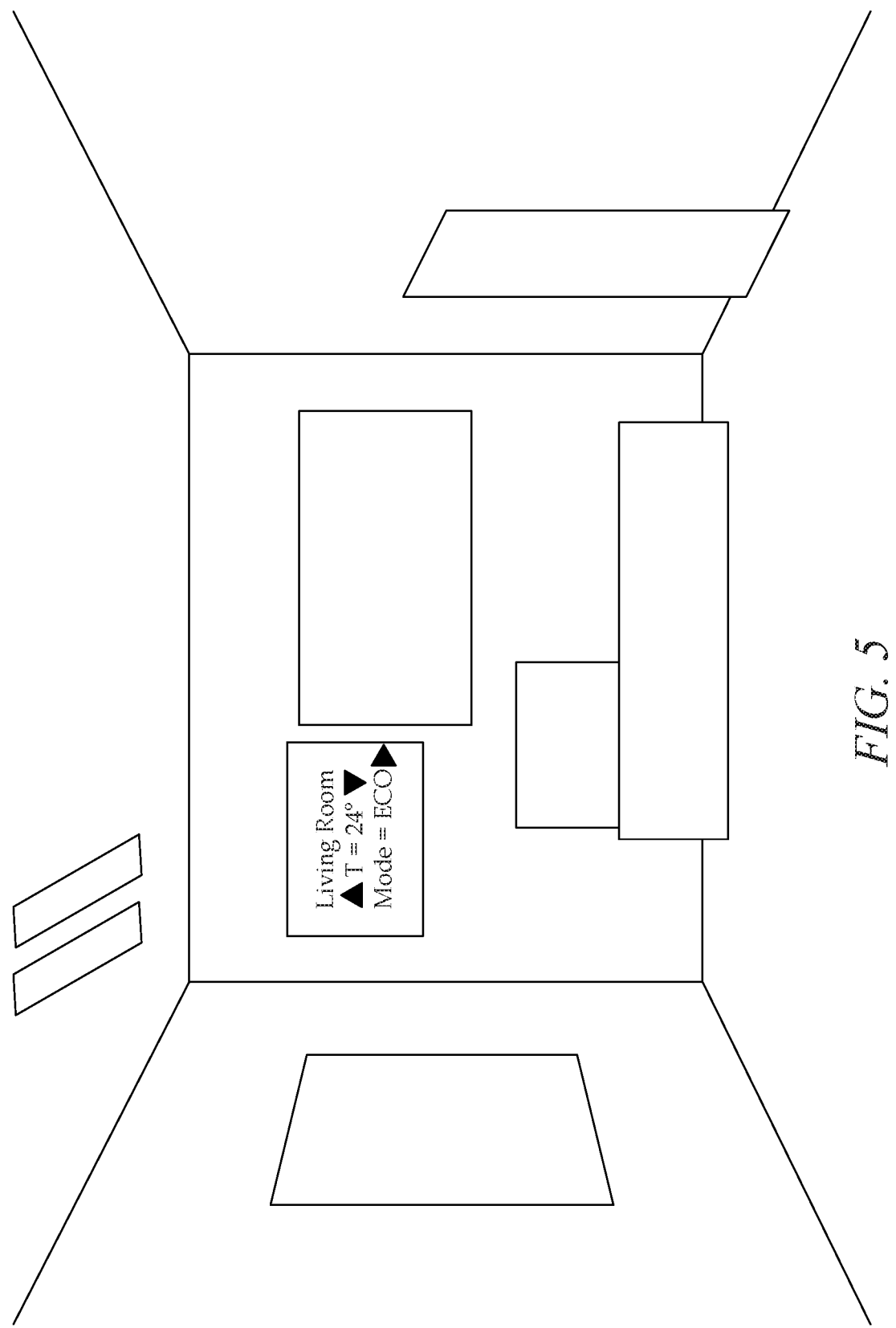
FIG. 5 is a block diagram of an example user interface for a device in augmented reality, according to some example embodiments.

FIG. 5 shows the living room of FIG. 4 with a UI for the thermostat superimposed on top of the thermostat. The UI of FIG. 5 is presented in response to a user command in the form of the user's gaze being directed to the thermostat, the AR device being pointed at the thermostat (e.g., through a head rotation of the user or using a controller), a voice command being received, or any suitable combination thereof. The UI of FIG. 5 shows the current status of the thermostat and may include the current temperature, the temperature in other rooms, the humidity level, a mode the device is currently working in, or any suitable combination thereof.

Figure 6:
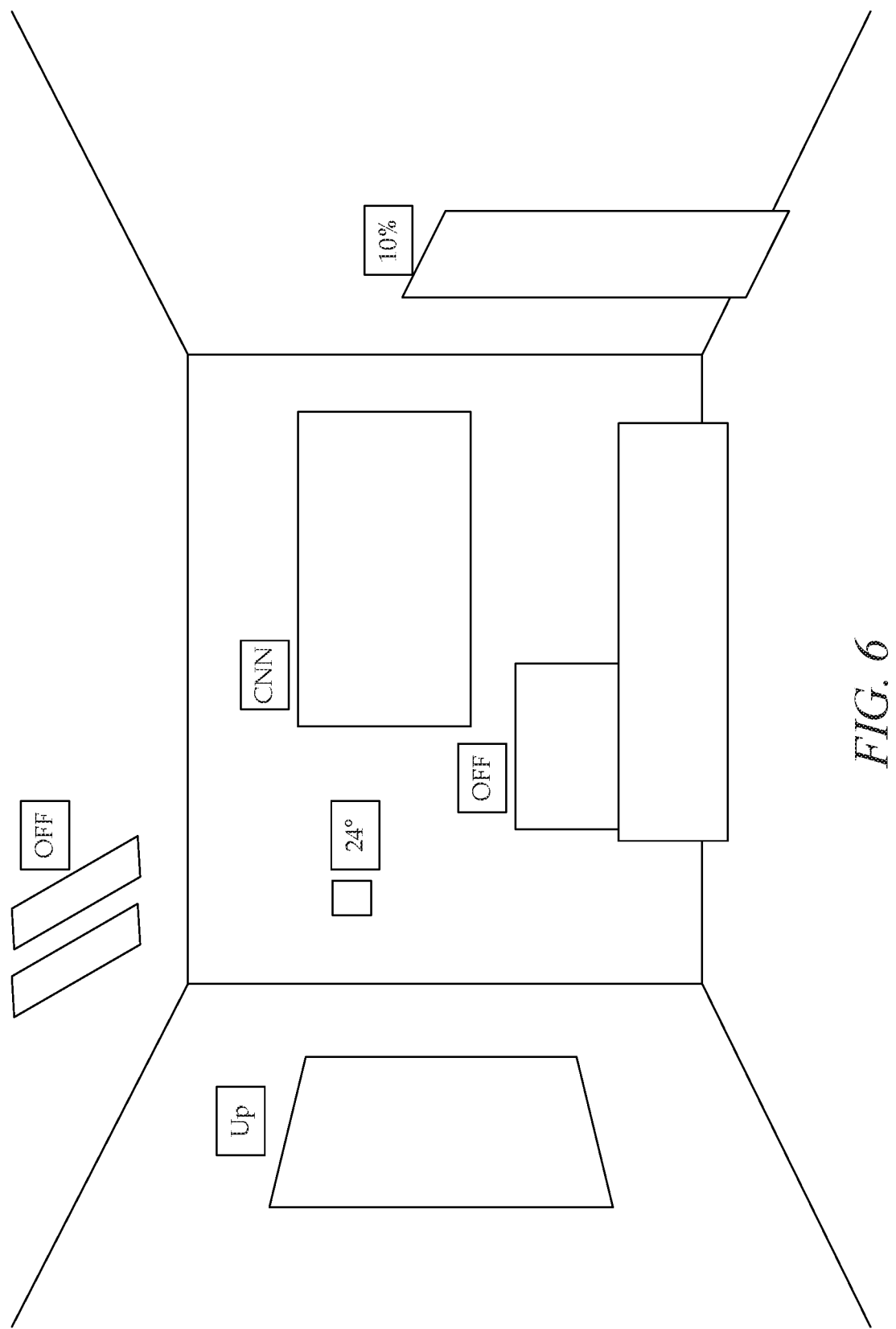
FIG. 6 is a block diagram of an example user interface for a device in augmented reality, according to some example embodiments.

FIG. 6 shows the living room of FIG. 4 with a small UI for each target device within the field of view. For example, the blinds show whether they are raised or lowered, the thermometer shows the current temperature, the ceiling lights and stereo show that they are turned off, the TV shows the current channel, and the floor lamp shows the degree of lighting being provided. The information may be presented in a subtle way to avoid interfering with the user's ability to view physical items in the room.

Figure 7:
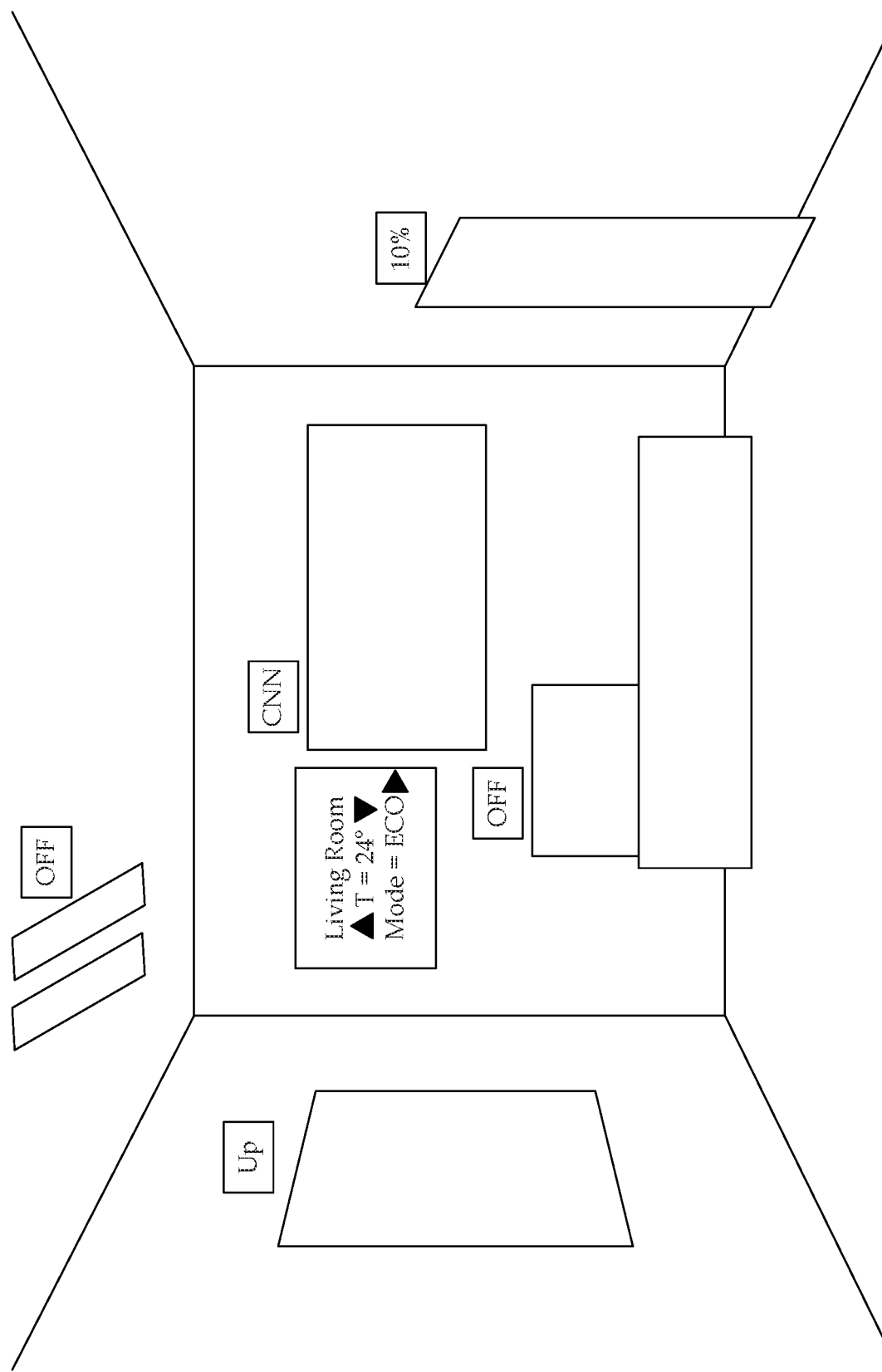
FIG. 7 is a block diagram of an example user interface for a device in augmented reality, according to some example embodiments.

FIG. 7 shows an example embodiment in which a larger UI for a selected device is shown while the smaller UIs for the other devices remain visible. The larger UI for the thermostat, as shown in FIG. 7, may be presented in response to the user's gaze being directed at the thermostat, the user's head being turned toward the thermostat, receipt of a voice input, a hand or head gesture, selection on a touchscreen, or any suitable combination thereof.

Figure 8:
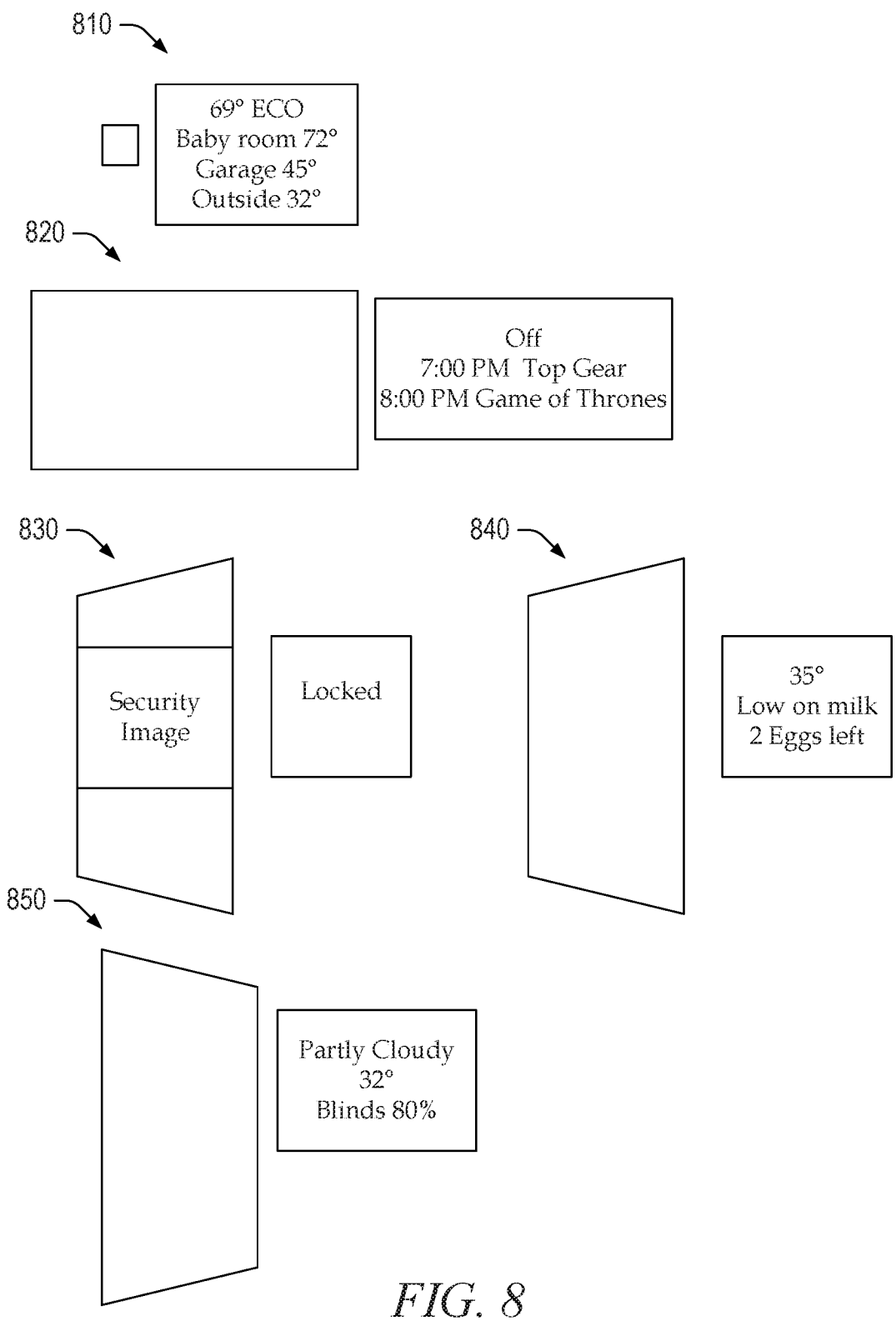
FIG. 8 is a block diagram of example user interfaces for devices in augmented reality, according to some example embodiments.

FIG. 8 shows five example UIs 810-850 for different target devices. The UI 810 is presented to the right of a thermostat and shows the current temperature (in Celsius or Fahrenheit) and mode of the thermostat as well as temperatures in three other rooms.

The UI 820 is presented next to a TV and shows that the TV is currently off along with upcoming programming. The upcoming programming may be presented for the last channel viewed, a favorite channel of the user, recommended programming for the user, or any suitable combination thereof.

The UI 830 is presented for a door. The UI 830 includes a security image superimposed over the door and a message indicating that the door is currently locked. The security image may be automatically selected or user-selected, and may be based on the door (e.g., different for each door), the type of door (e.g., different for interior and exterior doors), the status of the door (e.g., locked or unlocked), or any suitable combination thereof.

The UI 840 is presented for a refrigerator. The UI 840 indicates the current temperature of the refrigerator and also provides information regarding the contents of the refrigerator.

The UI 850 is presented for a set of window blinds. The UI 850 indicates the current weather and the degree to which the blinds are opened or closed. The information may be presented in text or icon form. For example, the text "partly cloudy" may be presented, an image with a sun peeking out from behind a cloud may be shown, or any suitable combination thereof.

The example UIs 810-850 may be displayed in response to detecting the user's gaze upon the associated target device. In some example embodiments, the displayed UI may be hidden by detecting that the user's gaze is no longer on the UI and has remained off of the UI for a predetermined period of time (e.g., 3 seconds), by detecting that the user's head is directed in a direction that removes the target device from the user's field of view, by receiving a voice command, by detecting a head or hand gesture, by detecting a tap or swipe on an external touchscreen, or any suitable combination thereof.

In some example embodiments, the UI is controlled using hand gestures. For example, a particular hand gesture may be associated with a particular menu option. As another example, the user may be able to use a finger to "touch" a presented menu option by placing the finger so that it occupies the same real location as the menu option appears to occupy, as presented by the AR device. In response to detecting the "touch," the menu option may be activated.

Figure 9:
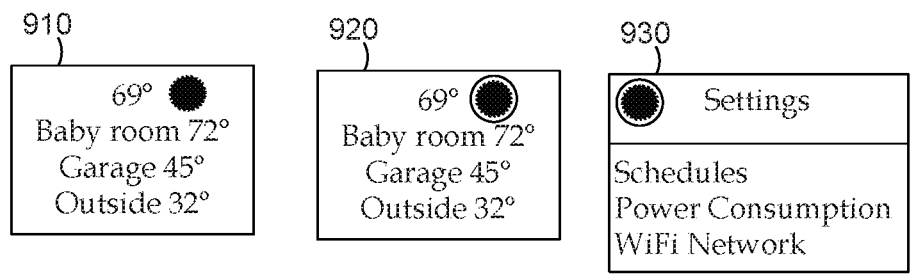
FIG. 9 is a block diagram of example user interfaces for a device in augmented reality, according to some example embodiments.

FIG. 9 shows an example UI sequence for controlling settings of a thermostat. The UI may be controlled by using eye gaze alone or in combination with other input modalities. For example, the gear-shaped settings button of a UI 910 may be activated when the user's gaze is detected upon it. The button may be highlighted (e.g., through a change in color, through a change in opacity, through a change in icon, or using another indicator, such as the circle shown in a UI 920) when activated. In response to the activation, or after the user's gaze has lingered on the button for at least a predetermined period of time (e.g., 0.5 seconds), a settings UI, such as a UI 930, may be shown. The elements in the UI 930 may be selectable by the user's gaze. The UI 930 may be scrolled vertically or horizontally in response to detection of the user's gaze at the top or bottom (for vertical scrolling) or left or right (for horizontal scrolling) of the list of settings.

Figure 10:
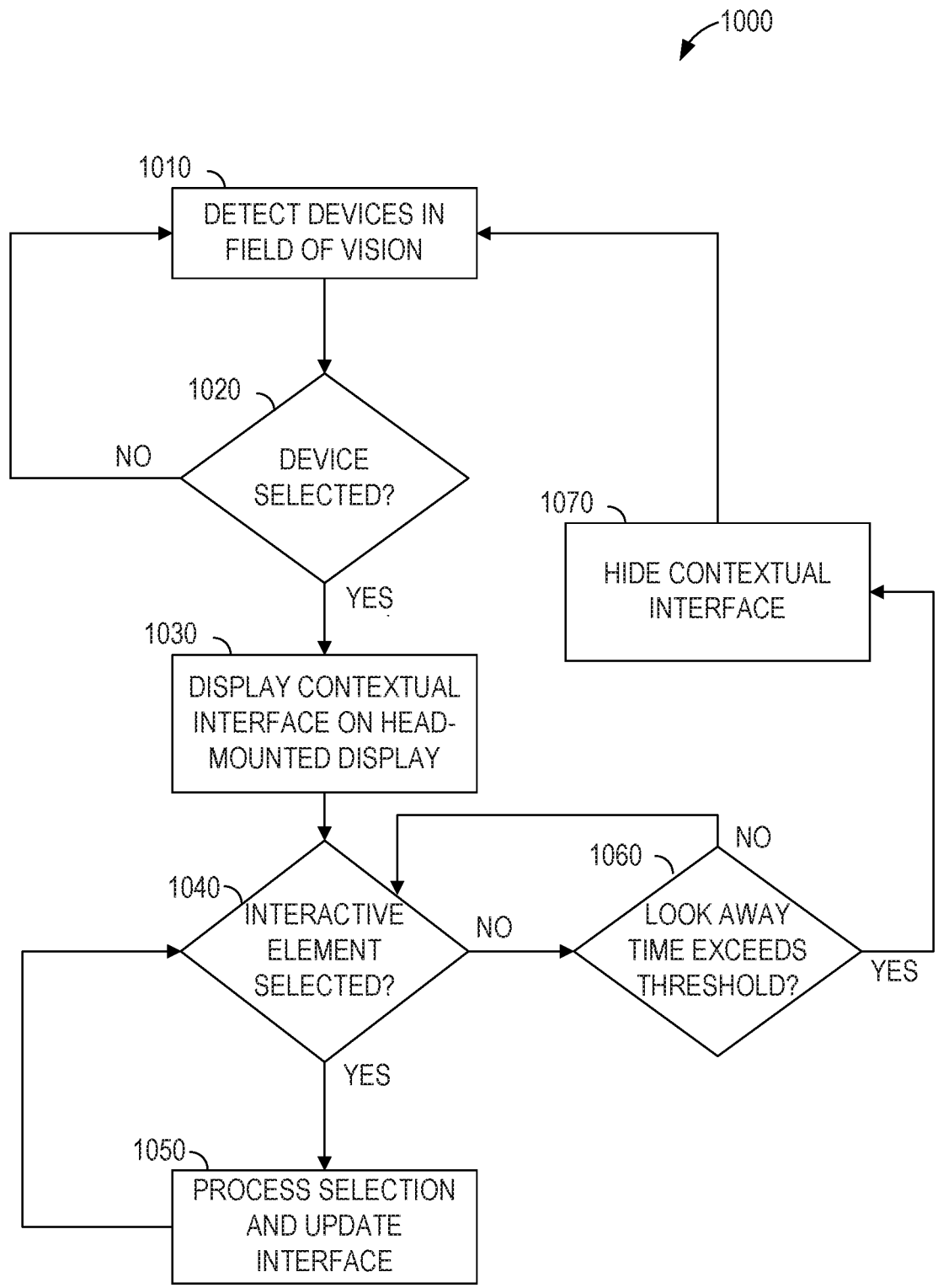
FIG. 10 is a flowchart of a method for controlling a device in augmented reality, according to some example embodiments.

FIG. 10 shows a flowchart for an example method 1000 of providing interaction with target devices using an AR device. In operation 1010, the system detects one or more target devices in the user's field of view and waits for a selection of a device. The system detects the selection of a target device in operation 1020. The selection of the target device may be performed by detecting that the user's gaze is directed to the target device, by detecting that the user's head is pointed toward the target device, by receipt of a voice command identifying the device, by detecting that a motion controller is pointed toward the target device, or any suitable combination thereof.

In operation 1030, in response to the selection of the target device, an interface is presented on a head-mounted display (e.g., a display of a head-mounted AR or VR device). The interface shows information related to the target device such as a current status of the target device, interactive elements operable to modify settings, interactive elements operable to cause the display of different or additional information, or any suitable combination thereof.

The interactive elements may be selected (operation 1040) using gaze input (e.g., by looking at them for at least one second). The gaze input may be combined with another input modality for confirmation. For example, an element may be selected using the gaze but no action taken until the selection is confirmed by detection of a tap on a touchscreen, wristband, sensor on the AR device, or any suitable combination thereof. In some example embodiments, the selection of elements is accomplished using hand or finger gestures in the air, on a touchpad, or both. Similarly, scrolling through a list of elements may be accomplished by swiping a touchpad on the frame of glasses of the AR device, on a smart watch, on a smartphone, or on a tablet. Alternatively, scrolling may be accomplished using hand or finger gestures. For example, a flick movement on top of the overlaid interface may be detected. In some example embodiments, head gestures are used for scrolling. For example, moving the head up, down, or to the sides may cause the menu to scroll in a corresponding direction.

In response to the selection of an interactive element, the selection is processed and the interface updated in operation 1050. For example, a new menu with further elements or information may be displayed. As another example, settings for the device (e.g., a target temperature for a thermometer or a degree of intensity for a light) may be modified. Additionally, visual or audio feedback may also be provided. Control then returns to the operation 1040, to determine if the user is interacting with an element of the new menu.

In operation 1060, a determination is made that the user has been looking away from the UI for at least a predetermined period of time. In response to that determination, the contextual interface is hidden (operation 1070). In some example embodiments, the interface is displayed near the device being controlled, such that if the field of view changes (e.g., through rotation of the user's head) the UI no longer appears when the device leaves the field of view.

Figure 11:
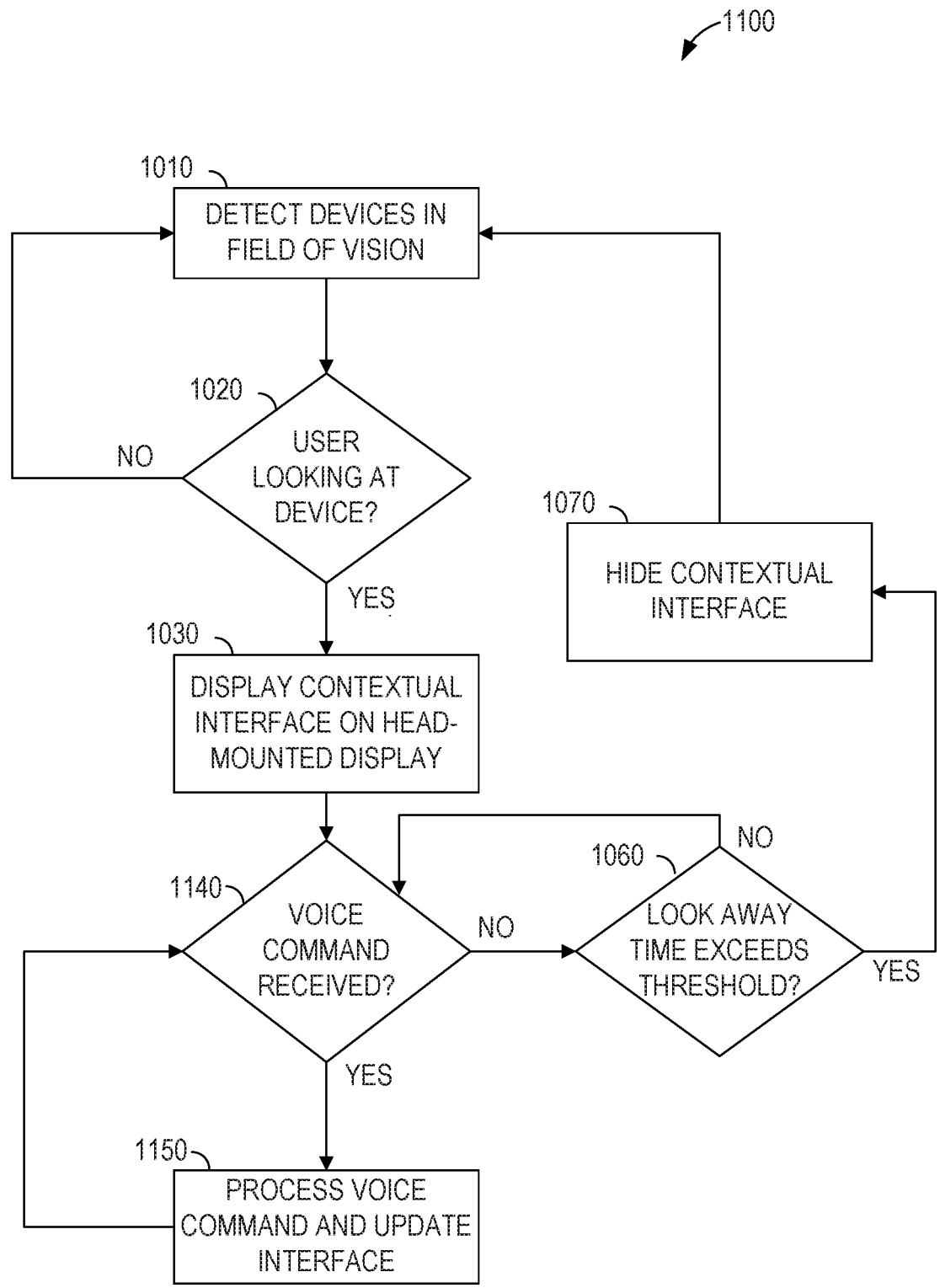
FIG. 11 is a flowchart of a method for controlling a device in augmented reality, according to some example embodiments.

FIG. 11 shows a flowchart for an example method 1100 of providing interaction with target devices using an AR device. Operations 1110-1130 and 1160-1170 may be performed in the manner of corresponding operations 1010-1030 and 1060-1070, described above.

In operation 1140, a voice command is detected. The voice command is processed and the interface updated in operation 1150. For example, a thermostat device may be selected in operation 1120. Information related to the temperature may be overlaid on the user's field of view in operation 1130. A voice command to set a new target temperature, change a mode, set a reminder, or any suitable combination thereof may be received in operation 1140, and an appropriate action taken in operation 1150. Some example voice commands include "set garage temperature to 55 degrees," "set reminder at 4 PM," and "set mode to auto."

The system may also use a combination of eye input and voice commands for enhanced interaction. The eye gaze information provides context as to what the user wants to interact with. For instance, the user may look at the garage temperature, and may use the command "55 degrees." The system will process the voice command, match it to the current device, and associate it with the element the user is looking at, in this case the garage temperature. By combining the eye gaze input and the voice command, the system can automatically set the temperature in the garage to 55 degrees.

Figure 12:
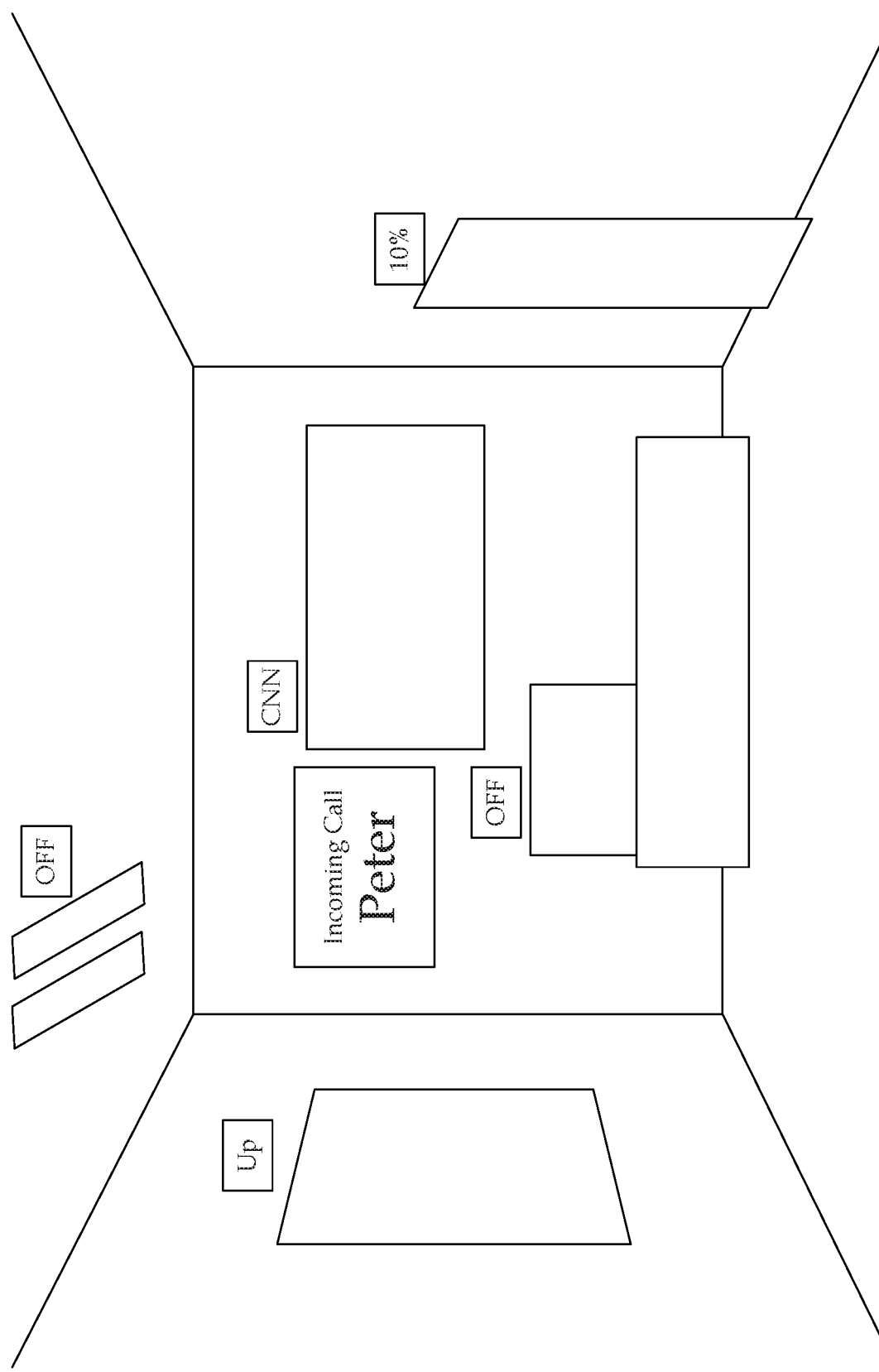
FIG. 12 is a block diagram of example user interfaces for devices in augmented reality, according to some example embodiments.

FIG. 12 shows the living room of FIG. 6, including small UIs for each detected device. As can be seen by comparison of FIG. 6 and FIG. 12, FIG. 12 further shows a UI displayed in response to a signal received over a network; this additional UI hides the UI for the thermostat shown in FIG. 6. In this example, the signal is an incoming video call and the UI indicates the type of the signal and information about the signal (in this case, the name of the caller). The user may respond to the signal by looking at a device and issuing a voice command. For example, the user may look at the TV and say "answer here." The system, by determining that that the user's gaze is directed to the TV, may send the voice command to the app for the TV, along with the context that an incoming call is pending. The app for the TV may respond to the command and the context to send a request to the video-call system for video data to be sent to the TV. Accordingly, in this example, video for the call will be displayed on the TV instead of within the AR device.

Figure 13:
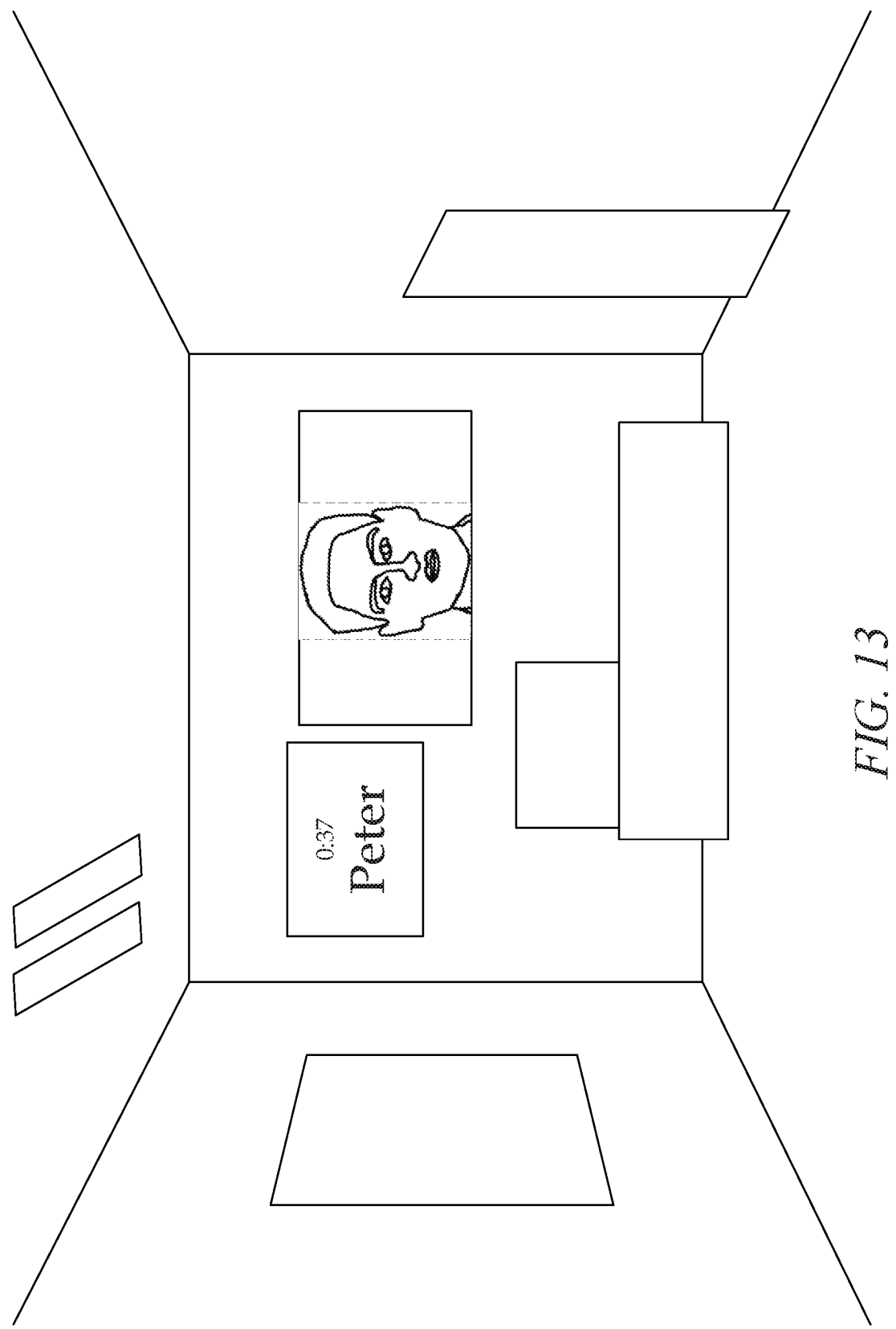
FIG. 13 is a block diagram of an example user interface for a device in augmented reality, according to some example embodiments.

FIG. 13 shows the video call in progress. The small UIs have been removed, the caller's image is displayed on the TV, and a separate UI for the call is shown. In this case, the duration of the call and name of the caller are displayed.

In another example, the user receives an email with image attachments. The user looks at a desktop computer screen and says "open pictures here." The AR device then communicates with the desktop computer over a network to send the attached images to an image-display application of the desktop computer.

Certain embodiments are described herein as including logic or a number of components, modules, or mechanisms. Modules may constitute hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations are performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Figure 14:
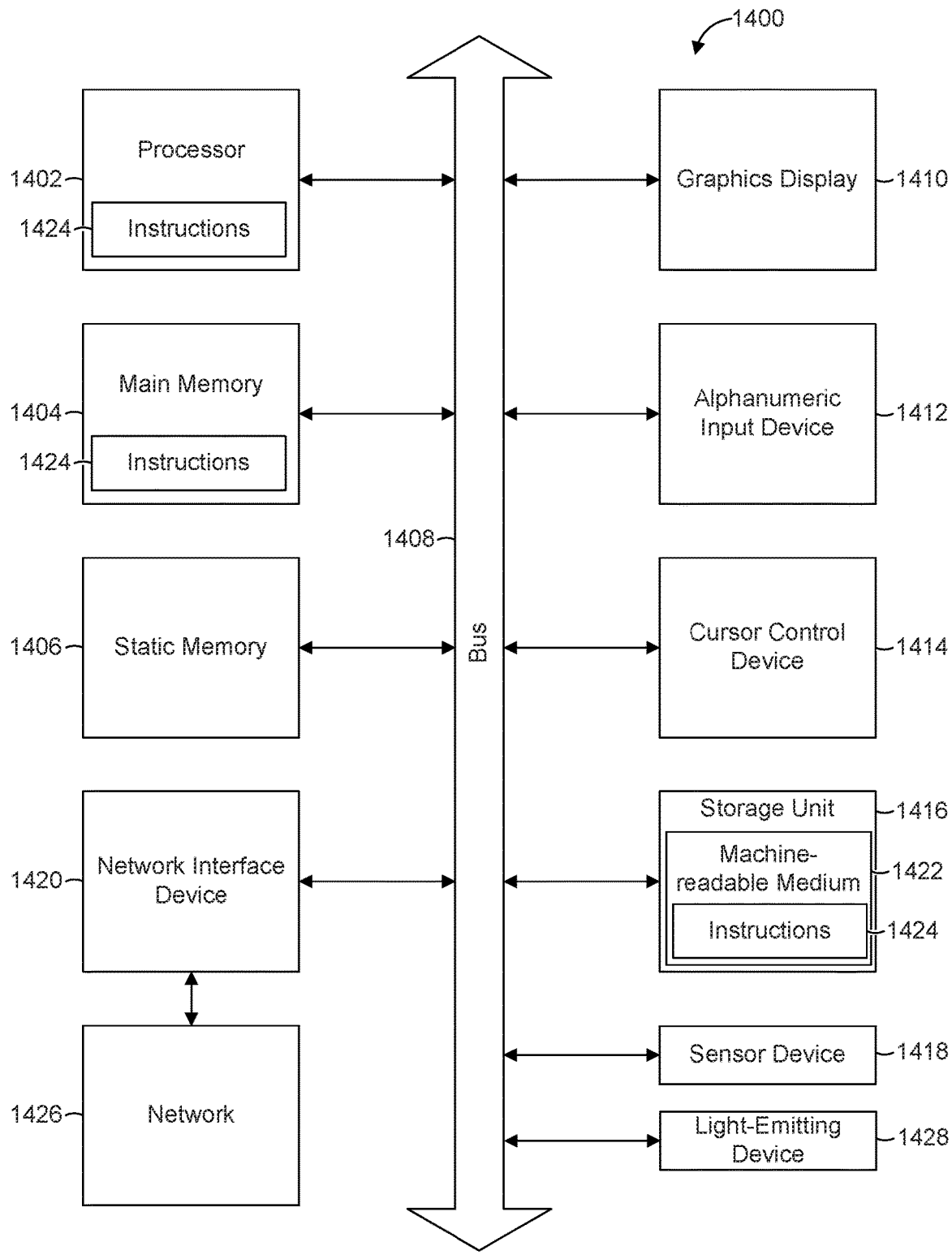
FIG. 14 is a block diagram of a machine in the example form of a computer system within which a set of instructions, for causing the machine to perform any one or more of the methodologies discussed herein, may be executed, according to some example embodiments.

FIG. 14 is a block diagram of a machine in the example form of a computer system 1400 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU), or both), a main memory 1404, and a static memory 1406, which communicate with each other via a bus 1408. The computer system 1400 may further include a graphics display 1410 (e.g., a liquid crystal display (LCD) or a cathode ray tube (CRT)). The computer system 1400 also includes an alphanumeric input device 1412 (e.g., a keyboard), a cursor control device 1414 (e.g., a mouse or touch sensitive display), a storage unit 1416, a sensor device 1418 (e.g., a camera, an accelerometer, a magnetometer, a light meter) a network interface device 1420, and a light emitting device 1428 (e.g., one or more LEDs).

The storage unit 1416 includes a machine-readable medium 1422 on which is stored one or more sets of instructions and data structures (e.g., software) 1424 embodying or utilized by any one or more of the methodologies or functions described herein. The instructions 1424 may also reside, completely or at least partially, within the main memory 1404, within the static memory 1406, and/or within the processor 1402 during execution thereof by the computer system 1400, the main memory 1404 and the processor 1402 also constituting machine-readable media.

While the machine-readable medium 1422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 1424 may further be transmitted or received over a communications network 1426 using a transmission medium. The instructions 1424 may be transmitted using the network interface device 1420 and any one of a number of well-known transfer protocols (e.g., hypertext transfer protocol (HTTP)). Examples of communication networks include a local area network (LAN), a wide area network (WAN), the Internet, mobile telephone networks, plain old telephone system (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

Although the technology has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    detecting, at a wearable computing device configured to be worn by a user, a plurality of devices in an image, the image captured by a camera that is configured to capture images of an environment of the wearable computing device, wherein the plurality of devices are physical objects in the environment;

determining a user selection of a target device of the plurality of devices, wherein the target device is of a different type than a first device of the plurality of devices;

establishing a wireless connection between the wearable computing device and the target device;

obtaining a status of the target device via the wireless connection;

selecting a control interface for the target device from a plurality of control interfaces, and the plurality of control interfaces are associated with different respective devices and includes a control interface for the first device, wherein each of the plurality of control interfaces includes a respective interactive element that controls an action of the associated device;

presenting, on a display of the wearable computing device, the status of the target device and the selected control interface, the selected control interface including an interactive element that controls an action of the target device, wherein the action of the target device is different from the action of the first device;

responsive to receiving a user interaction with the interactive element, transmitting instructions to the target device via the wireless connection to perform the action, wherein the target device performs the action in accordance with the instructions;

obtaining an updated status of the target device via the wireless connection; and presenting on the display the updated status of the target device.

2. The method of claim 1, wherein the determining the user selection of the target device comprises:
determining, via gaze detection, that the user is looking at the target device.

3. The method of claim 2, further comprising:
determining, via gaze detection, that the user is no longer looking at the target device; and
ceasing the presentation of the selected control interface, based on the determination that the user is no longer looking at the target device and a predetermined time threshold.

4. The method of claim 1, further comprising:
receiving a control input for the selected control interface via gaze detection.

5. The method of claim 1, further comprising:
receiving a control input for the selected control interface via voice command.

6. The method of claim 1, the method further comprising:
prior to the presenting of the selected control interface associated with the target device, presenting an augmented reality interface that includes a user interface for each of the plurality of devices in the image.

7. The method of claim 6, wherein:
the user interface for device of the plurality of devices in the image, other than the user interface for the target device, remains visible while the selected control interface associated with the target device is presented.

8. The method of claim 6, further comprising:
detecting a hand gesture; and
wherein:
the presenting of the selected control interface on the display is further in response to the detection of the hand gesture.

9. The method of claim 1, wherein:
the display is an augmented reality display; and
the presenting of the selected control interface on the display comprises presenting at least a portion of the selected control interface superimposed over the target device.

10. The method of claim 1, wherein:
the display is an augmented reality display; and
the presenting of the selected control interface on the display comprises presenting the selected control interface near to the target device.

11. A system comprising:
a display of a wearable computing device configured to be worn by a user;
a camera of the wearable computing device, the camera configured to capture images of an environment of the wearable computing device;
a memory storing instructions; and
one or more processors configured by the instructions to perform operations comprising:
detecting, at the wearable computing device, a plurality of devices in an image, the image captured by the camera, wherein the plurality of devices are physical objects in the environment,
determining a user selection of a target device of the plurality of devices, wherein the target device is of a different type than a first device of the plurality of devices,
obtaining a status of the target device via the wireless connection,
selecting a control interface for the target device from a plurality of control interfaces, and the plurality of control interfaces are associated with different respective devices and includes a control interface for the first device, wherein each of the plurality of control interfaces includes a respective interactive element that controls an action of the associated device,
presenting, on the display, the status of the target device and the selected control interface, the selected control interface including an interactive element that controls an action of the target device, wherein the action of the target device is different from the action of the first device,
responsive to receiving a user interaction with the interactive element, transmitting instructions to the target device via the wireless connection to perform the action, wherein the target device performs the action in accordance with the instructions,
obtaining an updated status of the target device via the wireless connection, and
presenting on the display the updated status of the target device.

12. The system of claim 10, wherein the determining the user selection of the target device comprises:
determining, via gaze detection, that the user is looking at the target device.

13. The system of claim 12, wherein the operations further comprise:
determining, via gaze detection, that the user is no longer looking at the target device; and
ceasing the presentation of the selected control interface, based on the determination that the user is no longer looking at the target device and a predetermined threshold.

14. The system of claim 11, wherein the operations further comprise:
receiving a control input for the selected control interface via gaze detection.

15. The system of claim 11, wherein the operations further comprise:
receiving a control input for the selected control interface via voice command.

16. The system of claim 11, wherein the operations further comprise:
prior to the presenting of the selected control interface associated with the target device, presenting an augmented reality interface that includes a user interface for each of the plurality of devices in the image.

17. The system of claim 16, wherein:
the user interface for each device of the plurality of devices in the image, other than the user interface for the target device, remains visible while the control interface associated with the target device is presented.

18. The system of claim 16, wherein:
the operations further comprise:
detecting a hand gesture; and
the presenting of the selected control interface on the display is further in response to the detection of the hand gesture.

19. The system of claim 11, wherein:
the display is an augmented reality display; and
the presenting of the selected control interface on the display comprises presenting at least a portion of the selected control interface superimposed over the target device.

20. A non-transitory machine-readable storage medium storing instructions which, when executed by one or more processors, cause the one or more processors to perform operations comprising:
detecting, at a wearable computing device worn by a user, a plurality of devices in an image, the image captured by a camera that is configured to capture images of an environment of the wearable computing device, wherein the plurality of devices are physical objects in the environment;
determining a user selection of a target device of the plurality of devices, wherein the target device is of a different type than a first device of the plurality of devices;
establishing a wireless connection between the wearable computing device and the target device;
obtaining a status of the target device via the wireless connection;
selecting a control interface for the target device from a plurality of control interfaces, and the plurality of control interfaces are associated with different respective devices and includes a control interface for the first device, wherein each of the plurality of control interfaces includes a respective interactive element that controls an action of the associated device;
presenting, on a display of the wearable computing device, the status of the target device and the selected control interface, the selected control interface including an interactive element that controls an action of the target device, wherein the action of the target device is different from the action of the first device;
responsive to receiving a user interaction with the interactive element, transmitting instructions to the target device via the wireless connection to perform the action, wherein the target device performs the action in accordance with the instructions;
obtaining an updated status of the target device via the wireless connection; and
presenting on the display the updated status of the target device.

* * * * *